United States Patent
Jin et al.

(10) Patent No.: US 8,116,818 B2
(45) Date of Patent: Feb. 14, 2012

(54) METHOD AND SYSTEM FOR TRANSMITTER BEAMFORMING

(75) Inventors: Hang Jin, Plano, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1065 days.

(21) Appl. No.: 11/397,214

(22) Filed: Apr. 4, 2006

(65) Prior Publication Data

US 2006/0276228 A1 Dec. 7, 2006

Related U.S. Application Data

(60) Provisional application No. 60/687,259, filed on Jun. 2, 2005.

(51) Int. Cl.
*H04M 1/00* (2006.01)

(52) U.S. Cl. ............... 455/562.1; 342/175; 342/377; 342/378; 375/142; 375/143; 375/144; 375/145; 455/561

(58) Field of Classification Search ............... None
See application file for complete search history.

(56) References Cited

U.S. PATENT DOCUMENTS

| | | | | |
|---|---|---|---|---|
| 6,058,105 A | * | 5/2000 | Hochwald et al. | 370/310 |
| 6,154,661 A | * | 11/2000 | Goldburg | 455/562.1 |
| 6,185,440 B1 | * | 2/2001 | Barratt et al. | 455/562.1 |
| 6,738,020 B1 | * | 5/2004 | Lindskog et al. | 342/377 |
| 6,901,062 B2 | * | 5/2005 | Scherzer et al. | 370/335 |
| 7,088,765 B1 | * | 8/2006 | Green et al. | 375/142 |
| 2005/0047384 A1 | * | 3/2005 | Wax et al. | 370/338 |

* cited by examiner

*Primary Examiner* — Zhiyu Lu

(57) ABSTRACT

A system and method are provided for improving the performance of a beamforming antenna array in a wireless communications system. A predetermined number of spatial signatures are observed for a communications channel between a base station and a mobile terminal during a predetermined time period. One or more test spatial signatures are generated based on statistical analysis of the observed predetermined number of spatial signatures. A beamforming weight is derived based on the generated test spatial signatures for beamforming by an antenna subsystem of the base station.

17 Claims, 4 Drawing Sheets

METHOD AND SYSTEM FOR TRANSMITTER BEAMFORMING

CROSS REFERENCE

This application claims the benefits of U.S. Patent Application Ser. No. 60/687,259, which was filed on Jun. 2, 2005 entitled "Wide Beam-Width Transmitter Beam Forming."

FIELD OF THE INVENTION

This invention relates generally to antenna systems, and more particularly to an improved method and system for antenna beamforming utilizing test spatial signatures for generating beamforming weights.

BACKGROUND

In wireless communication systems, adaptive antenna arrays offer significant capacity and performance improvements, especially in interference-limited environment. This technology offers the ability to minimize same cell interference for mobile terminals being served simultaneously. It offers the prospect of a reduction of inter-cell interference. It also increases the signal-to-noise ratio of a particular mobile terminal being served and therefore enables an increase in user data rate. These benefits and advantages result in either higher data throughputs, or the ability to service more mobile terminals simultaneously, within a given cell or service infrastructure. This technology is generally referred to as smart antenna technology.

There is an ever-increasing demand on mobile wireless operators to provide voice and high-speed data services. At the same time, operators want to support more users per base station in order to reduce overall network cost and make the services affordable to subscribers. As a result, wireless systems that enable higher data rates and higher capacities have become very attractive. One way smart antennas technology has addressed this problem is advanced signal processing techniques called beamforming. This promising technology has already found its way into all the major wireless standards including 3GPP, 3GPP2, IEEE 802.16 and IEEE 802.11 systems.

There are two types of adaptive antenna array: diversity antenna array and beamforming antenna array. In a diversity antenna array, the data stream are coded in space and time and sent from multiple low-correlated antennas to achieve diversity gain. On the other hand, beamforming array utilizes the spatial directivity and provide beamforming gain. Spatial directivity requires a good correlation among antennas.

The multiple antennas of the array are typically deployed at the base station of each cell, and the signals transmitted or received by the antennas are combined with certain complex weights. Different antenna weights are used to extract the signals transmitted to or received from different mobile terminals within the cell. By properly adjusting the antenna beamforming weights, the multiple antennas can improve the signal-to-interference ratio (SIR) through beamforming.

With spatially separated antennas in the antenna array, beamforming becomes practical for both transmit and receive modes. Focusing radiant energy in the direction of a mobile terminal reduces the amount of overall power needed to be generated by the base station. Antenna array technology can be used to focus power coming from the mobile terminal to the base station via a reverse link or an uplink, as well as from the base station to the mobile terminal via a forward link or downlink.

Conventionally, the spatial signature detected in the most recently is used as a single basis for generating beamforming weights. The performance of the conventional communication systems with beamforming capability has been limited due to the impact of such issues as time varying channels and errors in channel computation. What is needed is an improved beamforming method for enhancing the performance of the wireless communications.

SUMMARY

Conventional beamforming systems utilize channel spatial signatures which are generated from the base station uplink channel traffics. The accuracy of the channel spatial signatures directly determines the beamforming weight, which in turn is the key component in determine the ultimate performance of the beamforming for antenna array subsystem. Conventional beamforming transmitters suffer from errors due to time varying channels and channel computation. A system and method are provided for improving the performance of a beamforming antenna array in a wireless communications system. By observing a predetermined times of channel spatial signatures, one or more test spatial signatures are generated based on statistical analysis of the observed spatial signatures for predicting channel characteristics. A beamforming weight is derived based on the generated test spatial signatures for beamforming by an antenna subsystem of the wireless communication system.

The proposed embodiments result in creating a relatively wider beam than conventional methods, but the solution improves the performance while avoiding spatial signature mismatch (effectively lost signals).

DETAILED DESCRIPTION OF THE INVENTION

Figure 1:
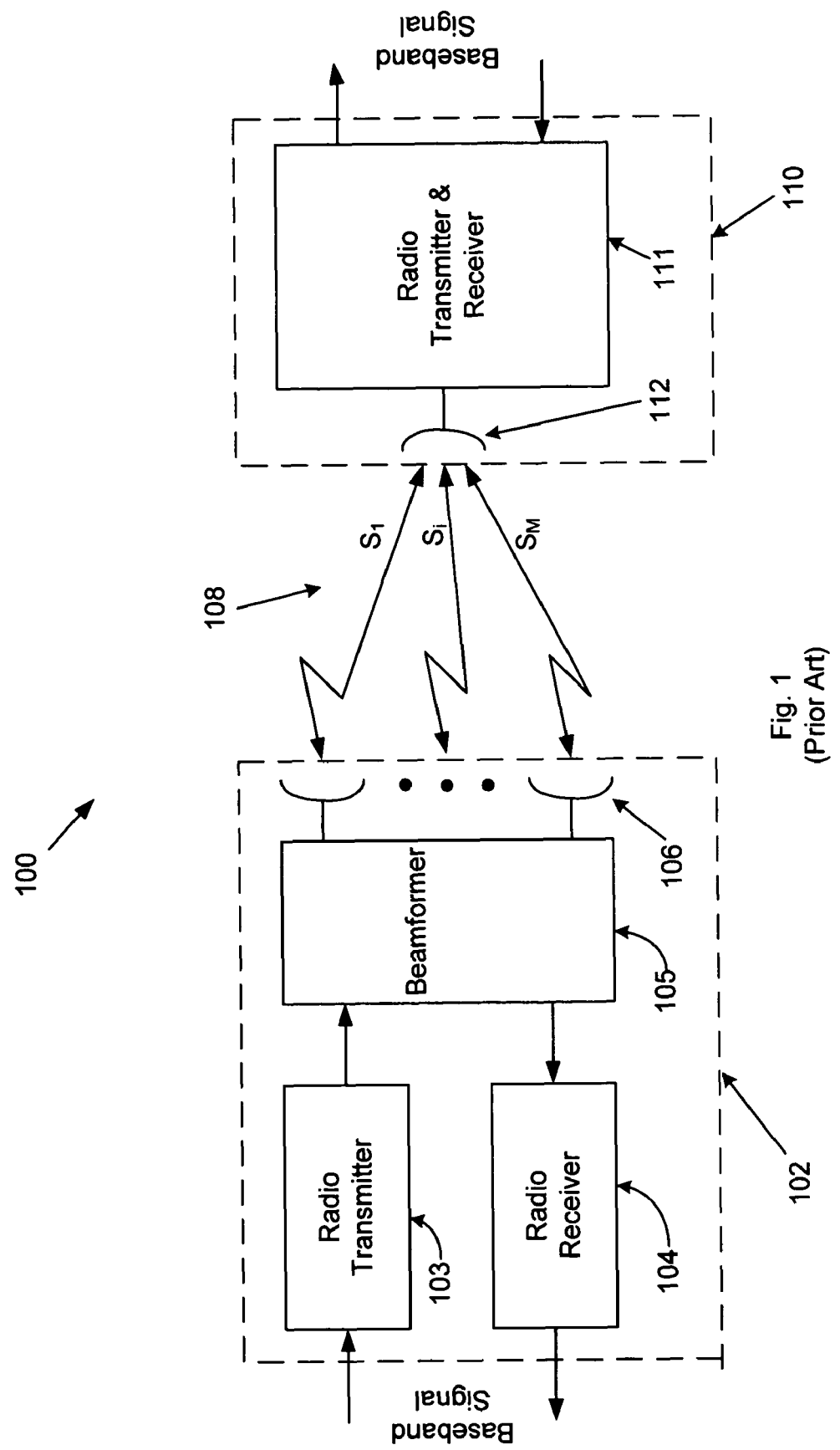
FIG. 1 is a diagram of a wireless communication system.

A wireless communication system 100 is illustrated in FIG. 1. The system 100 comprises a base station 102, which includes a radio transmitter 103, a radio receiver 104, a beamformer 105, and an antenna array 106. The antenna array 106 comprises a predetermined number of antennas in the array whose broadcasting angles can be adjusted.

The system 100 also comprises a mobile terminal 110, that communicates with the base station 102. It also includes a transmitter and receiver module 111 coupled to an antenna 112, which may have one or more antennas.

The base station 102 transmits, through the antenna array, radio signals $S_i$ 108, where i=1:N and N is the number of the antennas. The radio signal $S_i$ 108 exchanged between the base station 102 and the mobile terminal 110 contains the uplink channel and the downlink channel of the wireless communications system 100. In particular, the uplink signal travels from the mobile terminal 110, to the base station 102. Therefore, the uplink signal is the output signal of the mobile terminals 102, and the input signal to the base station 102. The air channel that the uplink signal travels through is denoted as the uplink channel. Similarly, the downlink signal travels from the base station to the mobile terminal. Therefore, the downlink signal is the output signal of the base station 102 and the input signal to the mobile terminal 110. The air channel that the downlink signal travels through is denoted as the downlink channel.

When broadcasting from the antenna array on the base station side, the downlink signal has various phases and magnitudes of the output signals transmitted from the antenna array 106. The phases and magnitudes of the downlink signal are adjusted according to a pre-determined scheme of the beamformer 105. This adjustment allows the radio signals $S_i$ 108 to be coherently combined at the desired mobile terminal 110. The beamforming weight W determines the adjustment made in the beamformer of the base station and dictates the outputs from the antennas. This process is denoted as transmitter beamforming.

The collective characteristics of the downlink channel are determined by the collective phase and magnitude of all the signal paths or channels in the downlink channel. This collective characteristic is denoted as the spatial signature for the downlink channel. The spatial signature is important for determining the beamforming weight, W. As noted above, based upon the beamforming weight W, the transmitter beamforming adjusts the phases and magnitudes of the output signals of base station 102.

The beamforming weight depends on both the downlink channel spatial signature and signal combining scheme of beamformer 105 of base station 102. For example, the spatial signature is expressed as $\{\alpha_1 \exp(-j\Phi_1), \alpha_2 \exp(-j\Phi_2), \ldots, \alpha_M \exp(-j\Phi_N)\}$, where $\alpha_i$ and $\Phi_i$ are the path loss and phase shift for ith downlink channel (i.e., the signal $S_i$ transmitted from antenna i of the base station will become $s_i * \alpha_i * \exp(-j\Phi_i)$ at the antenna of the desired mobile terminal 110). If the MRC (maximum ratio combining) scheme is utilized, then the beamforming weight W is given as follows:

$$W = B\{\alpha_1 \exp(j\Phi_1), \alpha_2 \exp(j\Phi_2), \ldots, \alpha_M \exp(j\Phi_N)\} \quad (1)$$

Where B is a constant, N is the number of antennas. The MRC scheme is one scheme typically used in conventional beamforming systems for improving radio performance. The method for signal combining is determined largely bases upon the signal to noise ratio (SNR) of each of the received signals.

Therefore, transmitter beamforming of the base station 102 makes use of the knowledge of the spatial signature of the downlink channels, i.e. the phase shift $\Phi$ and path loss $\alpha$. The magnitude and phase of the output signal of each antenna can be adjusted to allow the arrived signals at the desired mobile terminal to combine coherently. In an ideal situation, it is desired that the signal detection on the mobile terminal side occurs with a minimum of interference and distortion.

To a large extent, the accuracy of the assessed spatial signature determines the effectiveness of the transmitter beamforming. In conventional beamforming, the calculation of the beamforming weight W is based on the spatial signature collected in the immediate past, which is obtained using different methods such as a feedback method or based on the symmetry between the downlink and uplink channels.

In the feedback method, the base station 102 sends channel sounding signals to the desired mobile terminal 110. Channel sounding signals are test or training signals that are used to calibrate the wireless communication system 100. The sounding signals from the different antennas 106 need be coherent, i.e. their magnitude and phase differences at the transmitter output ports 106 need be pre-determined and known to the mobile terminal 110, and can be separated or decoded by the mobile terminal 110. The receiver of the mobile terminal 110 will compute the magnitude and phase of each sounding signal and feedback the information back to the base station 102.

The spatial signature of the channels can also be obtained using the channel symmetry method. In this case, the uplink paths from the desired mobile terminal 110 to the base station 102, and the downlink paths from those respective elements are compared. If the uplink paths are symmetric to the downlink path, the downlink channel spatial signature can be extracted from the traffics of the uplink path. Symmetry means that the uplink signals transmitted from the mobile terminal 110 to the base station 102 will experience the same attenuation and phase shift when it arrives at the base station 102 as the downlink signals transmitted from the base station 102 and received on the mobile terminal 110. The channel spatial signature of the uplink path is computed from the uplink traffic and then that signature is utilized to determine downlink channel beamforming.

For example, in Time Division Duplex systems, the downlink and uplink channels are on the same frequency spectrum but in different time periods in the interleaved downlink and uplink frames. If both channels experience little changes over the period of one frame, the downlink and uplink channels that are directly adjacent in time can be considered as symmetrical.

Figure 2:
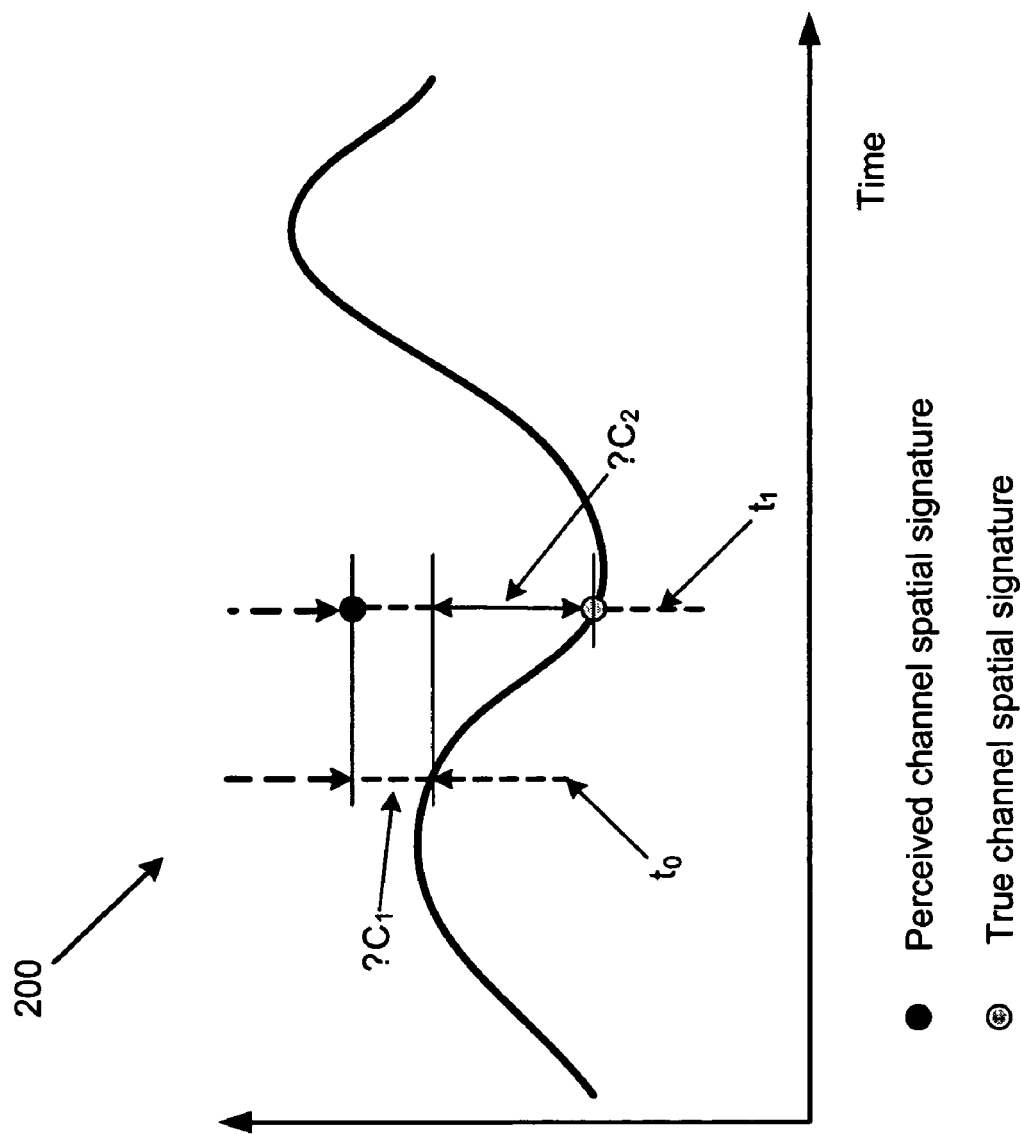
FIG. 2 is a diagram depicting errors in spatial signature which commonly occur in wireless communications systems.

However, there are some deficiencies with the aforementioned determination methods for spatial signatures. Some factors that impact the accuracy of spatial signatures include the errors caused by time varying channels and channel computation. FIG. 2 illustrates such errors graphically.

In the case of time varying channels, whether using the scheme of feedback or channel symmetry, there is a delay between the time when the channel spatial signature is computed and the time when such information is used for calculating weights for the next transmission through the antenna subsystem. For example, the path loss a and phase shift $\Phi$ of the channel are computed at time $t_0$, but are used at a later time, i.e., time $t_0$, for providing beamforming weight. In the case of feedback scheme, the $\Delta t = t_1 - t_0$ depends on how fast the mobile terminal 110 can compute $\alpha$ and $\Phi$ from the channel sounding signals and send them back through the uplink channels to the base station 102. In the systems of symmetrical channels like TDD systems, the minimum $\Delta t$ that can be achieved is limited by the frame duration. If the channel changes considerably over $\Delta t$, (for example, the desired mobile terminal 110 moves), then $\alpha$ and $\Phi$ computed at $t_0$ will not be accurate at time $t_1$ for beamforming purposes.

Furthermore, utilizing conventional beamforming methods for calculating channel spatial signatures can result in errors in the channel computation. It is inevitable that there will be some errors in the computation of the channel spatial signature. The errors may be caused by poor quality of the channel sounding signals for the feedback scheme, or the lack of the sufficient uplink traffic to extract accurate spatial signature while expecting symmetrical channel conditions. In any event, the errors in deriving the channel characteristics result in poor beamforming effectiveness eventually.

Mathematically, due to the possible errors described above, the channel spatial signature of the base station 102 is expressed as follows:

$$C = C_0 + \Delta C_1 + \Delta C_2 \quad (2)$$

where C represents the channel spatial signature (i.e. array of $\alpha$ and $\Phi$), $C_0$ represents the true channel spatial signature, $\Delta C_1$ is the error due to the inadequate channel computation, and $\Delta C_2$ the error caused by channel variations. These components of the spatial signature errors are illustrated in FIG. 2.

In order to address the issues of conventional beamforming methods, a wide beam-width transmitter beamforming is proposed according to one embodiment. In this method, the calculation of the beamforming weight does not directly and solely depend on the spatial signatures that are obtained through either the feedback or the channel symmetry method. Instead, a set of test spatial signatures are generated and the beamforming weight W is computed based upon that set of test spatial signatures. The resultant beam transmitted from the antennas has a relatively wider beam width than that corresponding to the conventional beamforming weight derivation method, which relies solely on one immediate past spatial signature.

Figure 3:
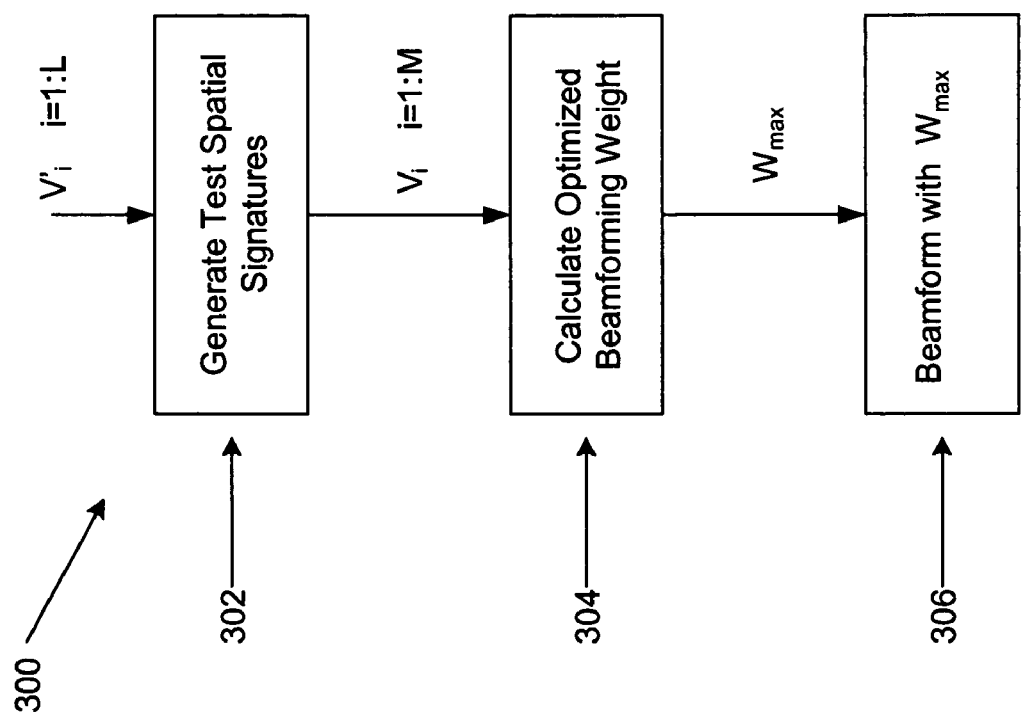
FIG. 3 is a flow diagram describing process steps taken for generating test spatial signatures and optimized beamforming weight according to one embodiment.

FIG. 3 illustrates a flow diagram 300 for implementing a wide beam-width transmitter beamforming process according to one embodiment. A set of test spatial signatures $V_i$ are generated in step 302 based upon a predetermined number of observed spatial signatures $V'_i$ of specific feedbacks or the uplink traffics from the mobile terminal. The observation of these spatial signatures can be performed by the base station alone or by the mobile terminal and then fed back to the base station. An optimized beamforming weight (e.g., $W_{max}$) is computed in step 304 based upon the test spatial signatures $V_i$. The derived beamforming weight is then utilized to drive the beamformer processor for beamforming in step 306, which in turn determines the output signal of the antenna arrays.

In step 302, the test spatial signals are calculated. The test spatial signatures are not the channel spatial signatures that were observed in the immediate past communications. Instead, they are a set of spatial signatures that are "statistically generated" from the observed spatial signatures of the mobile terminal feedback or the traffics of the uplink channel accumulatively over a predetermined period of time. Furthermore, the test spatial signatures are a set of predicted spatial signatures based on what have been observed in the past over the predetermined period. Therefore, the statistical analysis performed on the collected observed spatial signatures provides a much improved reliability than a single spatial signature in the most recent past. The statistical characteristics provide improved performance in transmitter beamforming by optimally adjusting the amplitude and phase of the signal transmitted through the downlink channel.

There are several methods to generate test spatial signatures, including the norm of the errors method and the transform matrices method. In the norm of the error method, the test spatial signatures are calculated based upon the determination of the norm of the errors of the observed spatial signatures. The method entails taking a number of (e.g. L times) channel observations of the spatial signatures. The observations are obtained through mobile terminal 110 feedback, or the traffics of uplink path, and are denoted as $V'_1, V'_2, \ldots, V'_L$, where $V'_1$ is the earliest, and $V'_L$ is the latest of the observed time spatial signatures. The norm of the errors of the observed spatial signatures $\Delta$, is then calculated as $V'_i - V'_{i-1}$, wherein $i=2, 3, \ldots, L$.

With these observations and calculations, a predetermined number (e.g. M number) of test spatial signatures are determined by imposing a predetermined set of conditions. For example, one condition is that the Euclidian distance from the test spatial signature $V_i$ to the latest observed spatial signature $V'_L$, is substantially the same as the norm of the errors among the observed spatial signatures, $\Delta$. A second condition is that their Euclidian distance between different test spatial signatures, $V_i$ and $V_j$, are the same and that distance is maximized. In other words, the spatial signatures are evenly distributed in the vector space.

The mathematical expression for the norm of the errors method is given in the following matrix norm equations.

$$\|V_i - V'_L\| = \Delta \quad (3)$$

$$\text{MAX} \left\{ \underset{i=1:M}{\text{Sum}} \underset{\substack{j:1:M \\ j \ne i}}{\text{Sum}} \{\|V_i - V_j\|\} \right\}$$

$$\|V_i\| = 1 \quad i = 1:M$$

Figure 4:
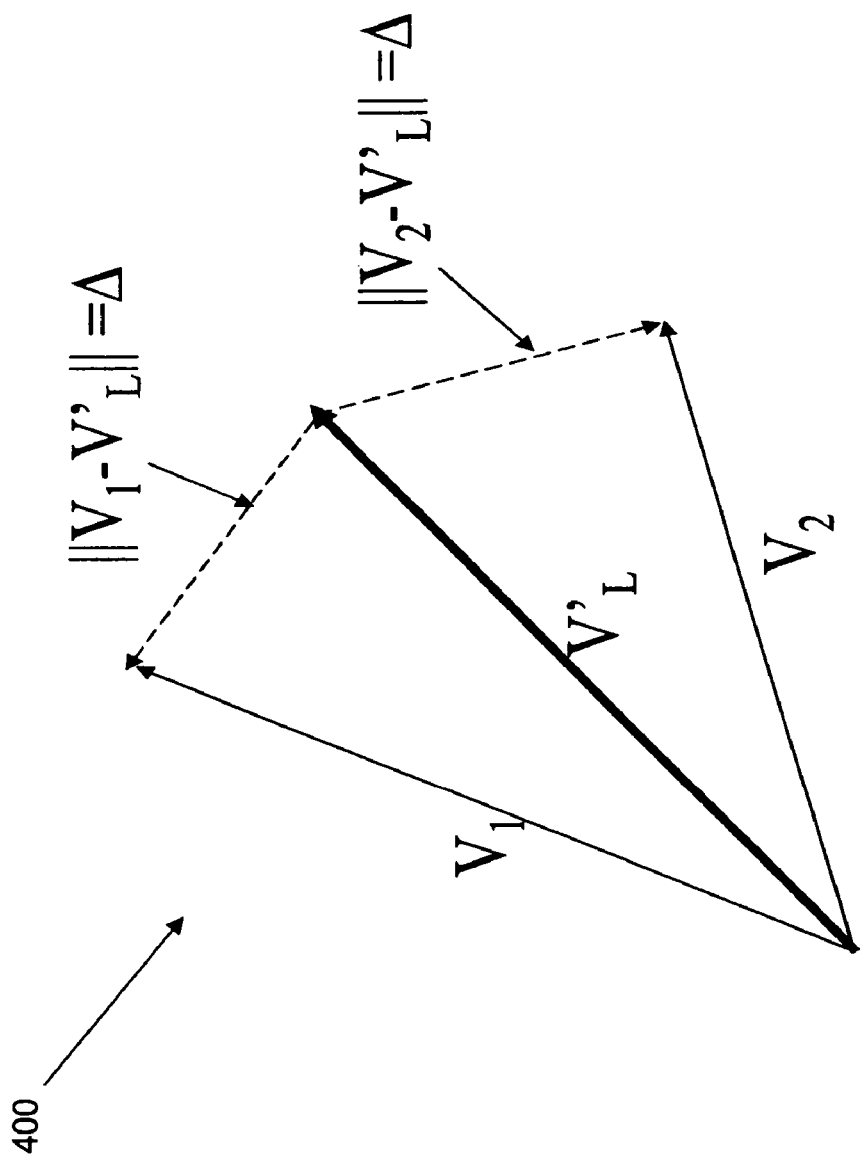
FIG. 4 is a geometric representation of test spatial signatures in a two dimensional space according to one embodiment.

FIG. 4 illustrates a geometric interpretation of equation (3) in the two dimensional space, where M=2 according to one embodiment. This illustration represents a set of vectors that have the same distance $\Delta$ to the vector $V'_L$ which represents the last observed spatial signature, and spread uniformly over the vector space. In this example, there are two test spatial signatures, $V_1$ and $V_2$ (i.e. M=2), presented, but there can be many more as the design requires. For example, in a three dimensional space, there can be infinite number of spatial signatures presented. As shown here in FIG. 4, the beam width is largely determined based on the distance between the last observed spatial signature and any of the test spatial signatures. By determining $V_1$ and $V_2$ the beam width is inherently widened compared to that determined by conventional methods.

In the transform matrices method, the test spatial signatures are determined based upon the calculation of a transform matrices solution for the observed spatial signatures. The method entails taking L times of channel observations of the spatial signatures. The observations are obtained through mobile terminal 110 feedback, or the traffics of uplink path, and are denoted as $V'_1, V'_2, \ldots, V'_L$, where $V'_1$ is the earliest, and $V'_L$ is the latest of the observed time spatial signatures.

With these observed spatial signatures, the (i−1)th transform matrix $T_{i-1}$ is calculated based upon two neighboring spatial signatures, the $V'_{i-1}$ and $V'_i$ observed spatial signatures, and utilizing a conjugate-transpose operation as will be shown below in equations (4), (5), and (6). The ith observed spatial signature vector $V'_i$ multiplied with the conjugate-transpose of the i-ith observed spatial signature vector $V'_{i-1}$ will give the transform matrix $T_{i-1}$. The transform matrix will be used to determine the test spatial signature. The jth test spatial signature $V_j$ is obtained by multiplying the transform matrix $T_j$, which is the same as $T_{i-1}$, with the observed spatial signature $V'_L$, wherein j represents one of the test spatial signatures. It is noted that the total number of test spatial signatures is M, and M is less than or equal to L−1, L is the number of the observed spatial signatures. Effectively, the transform matrices $T_j$ predict the future behavior of the spatial signature by determining the test spatial signatures.

For the transform matrices method, with the observed spatial signatures, one solution for obtaining the M test spatial signatures is expressed mathematically in the following matrix equations. First, the L−1 transform matrices are calculated based the various observed neighboring spatial signatures. Mathematically, the (i−1)th transform matrix $T_{i-1}$ has the relation with the two observed spatial signatures as:

$$T_{i-1} * V'_{i-1} = V'_i \quad i=2,3,\ldots,L \quad (4)$$

The $T_{i-1}$ given in equation (4) can be readily solved:

$$T_{i-1} = V'_i * (V'_{i-1})' \quad (5)$$

where ( )' means conjugate-transpose operation.

M test spatial signatures can be obtained as follows:

$$V_j = T_j * V'_L, j=1,2,\ldots,M\{M<=(L-1)\} \quad (6)$$

where $T_j$ represents the jth transform matrix, which is the same as $T_{i-1}$ given in (5).

Once the test spatial signatures are obtained, the beamforming weight for the next round of communication is derived. One method of beamforming weight calculation, based on the test spatial signatures, is formulated with the following matrix relationships which is further shown below in equation (7): the square of the determinant function of the hermitian matrix of the desired beamforming weight W multiplied by the test spatial signatures, $V_i$, for the ith antenna, is greater than a predetermined beamforming performance factor $\alpha$. The weight can be determined based on the now known test spatial signatures and the predetermined performance factor $\alpha$.

The predetermined beamforming performance factor $\alpha$ is empirically derived based upon the hardware implementation. For example, $\alpha=1$ represents perfect transmitter beamforming. In reality, $\alpha$ will be less than 1.

For illustration, the mathematical expression for the beamforming weight determination is expressed as follows:

$$\begin{aligned} |W^H * V_1|^2 &> \alpha \\ |W^H * V_2|^2 &> \alpha \\ &\vdots \\ |W^H * V_M|^2 &> \alpha \end{aligned} \quad (7)$$

Where $V_1, V_2, \ldots V_M$ are the test spatial signatures, each of them is a vector of dimension N, N is the number of transmitter antennas. M is the number of test spatial signatures. $W^H$ is the hermitian transpose of the weight sought W. And $\alpha$ is the pre-determined beamforming performance criterion, e.g. $0<\alpha<=1$.

Another alternative for deriving the beamforming weight is to identify the weight under the condition that the sum of the aforementioned determinant function multiplied by a weighted factor $A_i$ is maximized as shown in equation (8) below. Equation (8) can be converted from equation (7) as an optimization equation, as noted below:

$$\underset{W}{\text{Max}}\left\{\underset{i=1:M}{\text{Sum}}\{A_i * |W^H * V_i|^2\}\right\} \quad (8)$$

In equation (8), $A_i$ is the weighted factor for the ith test spatial signature, wherein i=1:M. The value of $A_i$ is dependent upon the accuracy of the test spatial signature $V_i$.

The weighted factor $A_i$ is adjusted based upon the reliability of the test spatial signature. If there is high confidence in the accuracy of the test spatial signatures, $A_i$ will be relatively large. Similarly, if there is low confidence in the accuracy of the test spatial signature, $A_i$ will be relatively small.

Simulations demonstrate a significant performance improvement using the embodiments described herein as compared with conventional beamforming systems. In one simulation, with mild fading channels, the wide-beamforming system achieves an additional 0.5 dB beamforming gain, as compared with a conventional solution. Moreover, with a severe fading channel, the wide-beamforming system achieves an additional 4 dB beamforming gain as compared with a conventional solution.

The wide beamforming technique is similar to a flash light used to track a moving insect at night. The insect bounces around erratically, trying to get rid of the light beam. As a result, tracking of the insect is often lost because the insect bounded out of the light beam. Since the insect jumps around randomly over a short period of time with a certain random deviation, if the flashlight beam is de-focused to make the beam wider, the insect remains tracked within the wider beam. Although the light luminosity is reduced due to the de-focus, enough light reaches insect. The downlink beamforming of antenna array is very similar to the flashlight beam tracking of a moving insect, and the wide beam-width beam forming technique performs a similar function to de-focusing the flashlight. The gain of the beamforming may be reduced due to the wide beamwidth; however, the wide beam-width beamforming significantly reduces the chance of a total spatial signature mismatch. As a result, the fading margin is significantly reduced as indicated by the simulation results.

Among the advantages of the techniques described herein are a more robust solution for transmitter beamforming. Although the beamwidth is expanded, the overall cumulative distribution function of the beamforming gain is still better than with conventional methods. The proposed invention provides more tolerance to time delay and errors in the spatial signature calculations.

The method for generating test spatial signatures and optimized beamforming weight is useful for wide beam-width transmitter beamforming system. The described wide beamwidth beamforming method as illustrated in FIG. 3 can be readily applied to existing wireless communication system. Additionally, mobile terminal 110 could incorporate a beamformer, and further incorporate the wide beam-width beamforming process as well. Then, both the base station and mobile terminal would have wide beam-width transmitter beamforming capability.

The embodiments as described herein are applicable to any telecommunication technologies with any multiple access schemes. Such access technologies include Frequency Division Multiple Access (FDMA), Time Division Multiple Access (TDMA), Code Division Multiple Access (CDMA), and Orthogonal Frequency Division Multiple Access (OFDMA) and any combination thereof, whether synchronized or unsynchronized, using Frequency Division Duplex (FDD) or Time Division Duplex (TDD).

The techniques described above provide many different embodiments, or examples, for implementing different features for transmitter beamforming using multiple spatial signatures. Also, specific examples of components and processes are described to help clarify the embodiment described herein. These are, of course, merely examples and are not intended to limit the invention from that described in the claims. It will be understood by those skilled in the art that various changes in form and detail may be made therein without departing from the spirit and scope of the invention.

What is claimed is:

1. A method comprising:
    observing a predetermined number of spatial signatures for a communications channel between a base station and a mobile terminal during a predetermined time period;
    calculating a norm of errors between neighboring pairs of the observed spatial signatures;
    generating at the base station one or more test spatial signatures from a previously observed spatial signature that form a vector space about the previously observed spatial signature based on statistical analysis of the observed predetermined number of spatial signatures, wherein generating the one or more test spatial signatures is based on the norm of errors, and such that the vector space is wider than a vector space associated with the observed predetermined number of spatial signatures; and deriving beamforming weights based on the one or more test spatial signatures for beamforming a transmission to the mobile terminal via an antenna subsystem of the base station, wherein the beamforming weights are configured to generate a wider de-focused beam relative to a beam generated from the observed predetermined number of spatial signatures.

2. The method of claim 1, wherein observing comprises observing the predetermined number of spatial signatures at the mobile terminal from downlink transmissions received at the mobile terminal from the base station, and further comprising sending data representing the predetermined number of spatial signatures from the mobile terminal to the base station.

3. The method of claim 1, wherein observing comprises observing the predetermined number of spatial signatures at the base station from uplink transmissions received at the base station from the mobile terminal.

4. The method of claim 1, wherein deriving comprises deriving the beamforming weights such that the beamforming weights satisfy the condition of when a square of a determinant of a Hermitian transpose matrix of the beamforming weights is individually multiplied by each of the test spatial signatures the result is greater than a predetermined beamforming performance factor.

5. The method of claim 1, wherein deriving comprises deriving the beamforming weights to maximize a summation of a square of a determinant of a Hermitian transpose matrix of the beamforming weights individually multiplied by each of the test spatial signatures.

6. The method of claim 5, further comprising multiplying each square by an individual weighting factor prior to adding the square to the summation.

7. The method of claim 1, wherein generating comprises generating the test spatial signatures such that a Euclidian distance from any of the test spatial signatures to a most recently observed spatial signature is substantially equal to the calculated norm of errors.

8. The method of claim 1, wherein generating comprises generating the test spatial signatures such that the test spatial signatures are evenly distributed in a vector space thereof in order to widen a beam when the beamforming weights are derived from test spatial signatures.

9. The method of claim 6, and further comprising adjusting each individual weighting factor based on an accuracy of a corresponding test spatial signature.

10. An apparatus comprising:
a plurality of antennas;
a beamformer unit configured to combine signals of various phases and magnitudes for transmission via the plurality of antennas such that the signals are coherently combined at a mobile terminal and to perform an inverse operation for signals received from the mobile terminal;
a receiver configured to:
observe a first predetermined number of spatial signatures for uplink transmissions received via the plurality of antennas during a predetermined time period; and
recover a second predetermined number of spatial signatures for downlink transmissions observed at the mobile terminal during the predetermined time period when the observations are made at a mobile terminal and are transmitted from the mobile terminal to the base station;
a transmitter configured to:
calculate a norm of errors between neighboring pairs of the observed predetermined number of spatial signatures;
generate one or more test spatial signatures from a previously observed spatial signature that form a vector space about the previously observed spatial signature based on statistical analysis of the observed first and/or second predetermined number of spatial signatures in order to generate the vector space that is wider than a vector space associated with the observed predetermined number of spatial signatures, wherein the one or more test spatial signatures are generated based on the norm of errors; and
derive beamforming weights based on the generated test spatial signatures, wherein the beamforming weights are configured to generate a wider de-focused beam relative to a beam generated from the observed predetermined number of spatial signatures.

11. The apparatus of claim 10, wherein the transmitter is configured to generate the test spatial signatures such that a Euclidian distance from any of the test spatial signatures to a most recently observed spatial signature is substantially equal to the calculated norm of errors.

12. The apparatus of claim 10, wherein the transmitter is configured to derive the beamforming weights such that the beamforming weights satisfy the condition of when a square of a determinant of a Hermitian transpose matrix of the beamforming weights is individually multiplied by each of the test spatial signatures the result is greater than a predetermined beamforming performance factor.

13. The apparatus of claim 10, wherein the transmitter is configured to derive the beamforming weights to maximize a summation of a square of a determinant of a Hermitian transpose matrix of the beamforming weights individually multiplied by each of the test spatial signatures.

14. The apparatus of claim 13, wherein the transmitter is configured to derive the beamforming weights to maximize a summation of a square of a determinant of a Hermitian transpose matrix of the beamforming weights individually multiplied by each of the test spatial signatures.

15. The apparatus of claim 14, wherein the transmitter is further configured to multiply each square by an individual weighting factor prior to adding the square to the summation.

16. The apparatus of claim 10, wherein the transmitter is configured to generate the test spatial signatures such that a Euclidian distance from any of the test spatial signatures to a most recently observed spatial signature is substantially equal to the calculated norm of errors.

17. The apparatus of claim 10, wherein the transmitter is configured to generate the test spatial signatures such that the test spatial signatures are evenly distributed in a vector space thereof in order to widen a beam when the beamforming weights are derived from test spatial signatures.

* * * * *